(12) United States Patent
Granbery (10) Patent No.: US 9,524,499 B2
(45) Date of Patent: Dec. 20, 2016

(54) SYSTEMS, METHODS, AND COMPUTER PROGRAM PRODUCTS PROVIDING ELECTRONIC COMMUNICATION DURING TRANSACTIONS

(71) Applicant: PAYPAL INC., San Jose, CA (US)

(72) Inventor: John Hastings Granbery, Los Altos, CA (US)

(73) Assignee: PayPal, Inc., San Jose, CA (US)

( * ) Notice: Subject to any disclaimer, the term of this patent is extended or adjusted under 35 U.S.C. 154(b) by 24 days.

(21) Appl. No.: 13/629,266

(22) Filed: Sep. 27, 2012

(65) Prior Publication Data

US 2013/0080276 A1 Mar. 28, 2013

Related U.S. Application Data

(60) Provisional application No. 61/540,351, filed on Sep. 28, 2011.

(51) Int. Cl.
*G06G 1/12* (2006.01)
*G06Q 20/00* (2012.01)
*G06Q 20/20* (2012.01)
*G06Q 20/32* (2012.01)
*G06Q 20/36* (2012.01)
*G06Q 20/38* (2012.01)

(52) U.S. Cl.
CPC .......... *G06Q 20/20* (2013.01); *G06Q 20/3227* (2013.01); *G06Q 20/3278* (2013.01); *G06Q 20/36* (2013.01); *G06Q 20/3823* (2013.01); *G06Q 20/3829* (2013.01); *G06Q 20/38215* (2013.01)

(58) Field of Classification Search
None
See application file for complete search history.

(56) References Cited

U.S. PATENT DOCUMENTS

| | | | |
|---|---|---|---|
| 6,105,006 A * | 8/2000 | Davis et al. | 705/35 |
| 2007/0005685 A1* | 1/2007 | Chau et al. | 709/203 |
| 2009/0143104 A1 | 6/2009 | Loh et al. | |
| 2010/0005294 A1 | 1/2010 | Kostiainen et al. | |
| 2010/0082481 A1* | 4/2010 | Lin et al. | 705/41 |
| 2011/0042456 A1 | 2/2011 | Masaryk et al. | |
| 2011/0251962 A1* | 10/2011 | Hruska | 705/72 |
| 2012/0209749 A1* | 8/2012 | Hammad et al. | 705/27.1 |
| 2012/0239417 A1* | 9/2012 | Pourfallah et al. | 705/2 |

(Continued)

OTHER PUBLICATIONS

"Welcome to Isis; Pay with Isis", printed from www.paywithisis.com/whatis.xhtml on Sep. 27, 2012,5 pages, date unknown.

*Primary Examiner* — Fateh M Obaid
(74) *Attorney, Agent, or Firm* — Haynes & Boone, LLP (57) ABSTRACT

An electronic device includes one or more processors configured to execute the instructions to: during a first communication session, sending first information regarding a transaction to a user device that is participating in the first transaction, interrupting the first communication session, pausing for a time to allow the user device to process the first information and to generate second information in furtherance of the transaction, establishing a second communication session with the user device, receiving the second information from the user device during the second communication session, and further processing the transaction using the second information.

20 Claims, 6 Drawing Sheets

(56) References Cited

U.S. PATENT DOCUMENTS

| | | | |
|---|---|---|---|
| 2012/0295580 A1* | 11/2012 | Corner | 455/405 |
| 2013/0029646 A1* | 1/2013 | Chowdhury et al. | 455/414.1 |
| 2013/0110658 A1* | 5/2013 | Lyman et al. | 705/41 |
| 2013/0218721 A1* | 8/2013 | Borhan et al. | 705/26.41 |

* cited by examiner

SYSTEMS, METHODS, AND COMPUTER PROGRAM PRODUCTS PROVIDING ELECTRONIC COMMUNICATION DURING TRANSACTIONS

PRIORITY DATA

This application claims priority to U.S. Provisional Patent Application Ser. No. 61/540,351, filed on Sep. 28, 2011, the entire disclosure of which is hereby incorporated herein by reference.

BACKGROUND

Technical Field

The present disclosure generally relates to electronic communications during transactions, and more particularly, to techniques for providing bi-directional secure communications during a transaction.

Related Art

It is common for consumers and businesses to have electronic accounts to send and receive payments from other parties. One example includes credit cards, which are typically read electronically and transfer money electronically. Another example is a payment service, such as that offered under the name PayPal™, which provides electronic wallets that users can link to credit cards, bank accounts, and any other form of payment.

One technique of payment with a credit card includes a consumer or merchant swiping a consumer's credit card to read a magnetic strip on the credit card. The magnetic strip includes payment credentials (e.g., the credit card number, expiration date, etc.), which the merchant's Point of Sale (POS) passes to a payment processor (e.g., the consumer's bank) to request payment. Another technique of payment includes a credit card having a Radio Frequency ID (RFID) chip therein that transmits the credentials to a terminal at the merchant's POS as an alternative to swiping.

Recently, systems have been created to allow a mobile device, such as a phone, to emulate the RFID chip in a card. A consumer can save his or her credentials to the phone, and an application on the phone communicates with a terminal, just as an RFID chip credit card would. An example of such a system is that provided by the service Google Wallet™ Such systems allow a consumer to make payments at a POS using a mobile device, which may be more convenient in some instances than carrying and/or using physical credit cards.

Examples of communication protocols for card emulation include those promulgated by the NFC Forum under the label Near Field Communication (NFC). For instance, ISO/14443 is a standard covering card emulation, and ISO 18092 is a more general standard that includes both NFC card emulation as well as an NFC peer-to-peer (P2P) mode. Technologies that use the NFC P2P mode include Simple NDEF Exchange Protocol (SNEP) and NDEF Push Protocol (NPP, a proprietary technique from Google).

NFC P2P techniques are relatively low-bandwidth and are limited by being unidirectional. In other words, apart from session negotiation and acknowledgement messages, NFC P2P mode passes the data payload in one direction per session.

Unidirectional communication protocols are not designed for challenge-response communications and, therefore, may not be able to support encrypted and secure communications that assume bidirectional capability. Thus, NFC P2P mode has been unusable for secure transactions.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting.

According to the various aspects of the present disclosure, a method, system, and computer program product are discussed below that provide for completing transactions using unidirectional communication protocols. Various embodiments are presented that provide convenience and security to the consumer or payer allowing payment at a Point of Sale (POS) using a mobile device or other device as appropriate.

In one example, a consumer has a mobile device (e.g., a smartphone, tablet, laptop, or other device) that has computing and NFC capability. The mobile device includes an application that communicates with a payment processor (e.g., a bank or a payment service, such as that offered by PayPal, Inc.) and with a communication terminal at a merchant's POS. Additionally, the merchant's communication terminal includes functionality to communicate with the consumer's mobile device in order to securely receive payment.

Continuing with the example, the terminal is programmed to manipulate NFC P2P communications to approximate a bidirectional communication session, even in instances wherein the application in the consumer's device operates according to conventional NFC P2P principles and does not support bidirectional communications. Specifically, the terminal interrupts a first communication session and starts a second communication session in a manner that causes the mobile phone application to act as if there has been two NFC "taps." A pause between the two sessions allows the consumer's device to process a response to a first communication by the terminal.

Briefly, in one working example, a user approaches a merchant's POS with goods to be purchased. The merchant scans the goods and provides a total cost to be paid to complete the transaction. The user has a mobile device with a payment application that uses an NFC P2P protocol and responds to the user's tap against the terminal. At the tap, the terminal and mobile device negotiate a communication session, and the terminal sends first information to the mobile device, where the first information includes a transaction identifier and an amount to be paid. The terminal then interrupts the first communication session and waits for a time sufficient to allow the application on the mobile device to generate a response and queue the response for sending. Second information in the response includes, e.g., payment credentials for a credit account or electronic wallet or a signed letter of credit. The terminal then starts a second communication session with the mobile device, where the mobile device checks its queue, and finding the response in the queue, sends the response to the terminal. The terminal processes the response and then sends an acknowledgement to the mobile device. The terminal can then communicate with the consumer's funding source to receive payment. Once payment is verified, the merchant provides a receipt to the consumer or otherwise indicates that the transaction is complete.

The example embodiment above may be accomplished by providing enhanced functionality at a POS terminal in its communication stack so that the terminal is able to use multiple unidirectional communication sessions, separated by a pause, for a given transaction. In some instances, the application at the mobile device may be implemented even without access to the NFC communication stack, thereby leveraging conventional NFC P2P behavior at the mobile device. For instance, one conventional NFC P2P behavior is for the mobile device to check its queue upon establishment of a communication session and, finding a message in its queue, automatically sending the message to its peer. A response to a terminal may be placed in the queue in expectation of the second "tap" from the terminal. Thus, in this example, NFC behavior may be changed at the terminal to implement the double-tap feature, though low-level NFC behavior may be unmodified at the mobile device. However, the scope of embodiments includes systems wherein the NFC behavior at the mobile device is modified as well.

The above examples are merely illustrative and provide a starting point for the more detailed examples below. For instance, some embodiments provide for the first transmission from the terminal to the mobile device to include a digital certificate and for the response back to the terminal to include encrypted payment credentials. However, the scope of embodiments is not limited to use of digital certificates, encryption, or any particular communication protocol. In fact, the scope of embodiments includes use of any communication protocol, whether NFC or otherwise, that is unidirectional with respect to the information payload.

In one example, a consumer has an account, such as a debit card account, a credit card, an electronic wallet (e.g., as provided by PayPal™), and/or the like. The consumer can use the account to pay for transactions via a user device, a merchant device, or a third party device, whether over a network or in-person. Similarly, merchants also have accounts where they receive payments from payment providers (e.g., banks or other payment services). In a conventional consumer transaction scenario, the consumer pays a merchant by presenting his or her account credentials to the merchant, where the merchant uses the consumer's account credentials to receive payment at a payment provider. The payment provider processes the payment by scheduling a money transfer to the merchant's account commensurate with the transaction, assuming the credentials presented by the merchant are valid.

Figure 1:
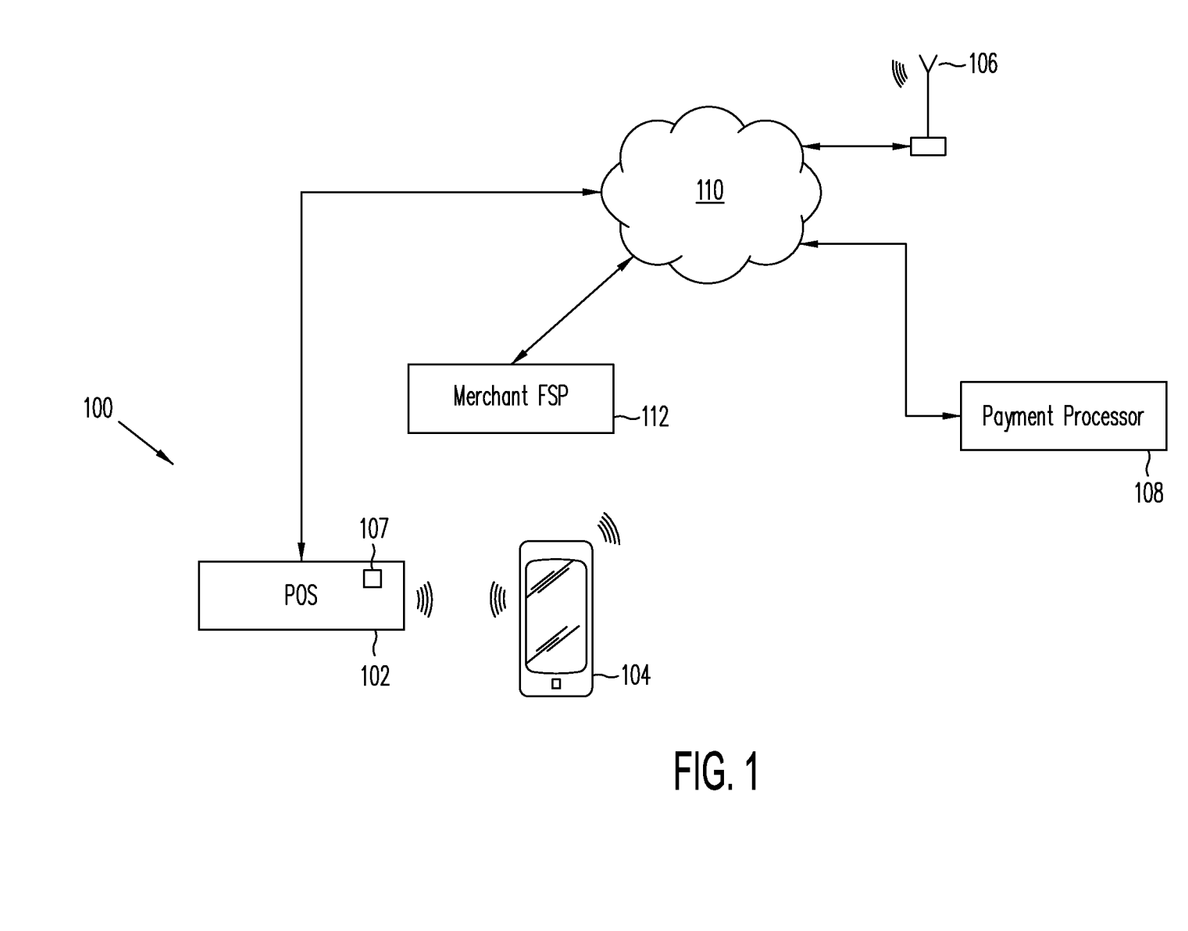
FIG. 1 illustrates an example system for making a payment at a merchant point of sale.

FIG. 1 is a simplified diagram of an example system 100 using payments from payment processor 108 to the merchant. In this scenario a consumer, purchaser, or other party desiring to transfer funds to the account of another party, is using a mobile device 104. The mobile device 104 has data transfer capability and is able to process messages and information between multiple systems. The POS 102 has similar capabilities to communicate with multiple systems. These systems may communicate over a networked system, such as over the Internet 110, or through a local network or cellular network (as exemplified by wireless base station 106).

The purchaser pays for the transaction by providing payment processor information to the merchant's POS 102, where payment processor information may include, e.g., account credentials for an account serviced by payment processor 108. The mobile device 104 and the POS 102 are electronic devices representing each of the parties to the transaction. The transaction is performed or completed through the electronic devices. The POS 102 receives the payment processor information, which may include credit card information or other financial information such as in the form of typical Automated Clearing House (ACH) messaging of a routing number, account number, check number or other funding source identification. The POS 102 provides the payment processor information to the merchant's Financial Services Provider (FSP) 112 to request the payment from the payment processor 108. The merchant FSP 112 includes information about a Receiver Account (RA) for the merchant.

The FSP 112 communicates with the payment processor 108 to facilitate the transfer of funds. In response, payment processor 108 provides the payment, or transfer of funds, to the RA of the merchant at FSP 112. This processing may involve other parties during the communication between payment processor 108 and FSP 112. In other embodiments, the POS 102 may provide the payment processor information directly to payment processor 108 to request a payment to FSP 112. Any such technique is within the scope of embodiments.

The payment processor 108 of this example is an electronic system(s) that maintains accounts for users and has capability for communication with electronic systems used by other funding sources and financial service providers. The FSP 112 maintains the receiver's financial account and includes an electronic system for communicating with electronic systems used by other financial service providers. Once the FSP 112 has received the transfer of funds, or a commitment that the funds are scheduled for transfer, the FSP 112 provides a confirmation to the POS 102. The merchant then provides such confirmation to the customer (e.g., by generating a paper or electronic receipt) and the transaction is complete.

Various embodiments herein provide for techniques to pass information between a customer's device (e.g., mobile device 104) and a merchant's device (e.g., POS 102). To that end, POS 102 includes communication application 107, which provides functionality to approximate bidirectional communication in order to trade information with mobile device 104 to complete the transaction.

Figure 2:
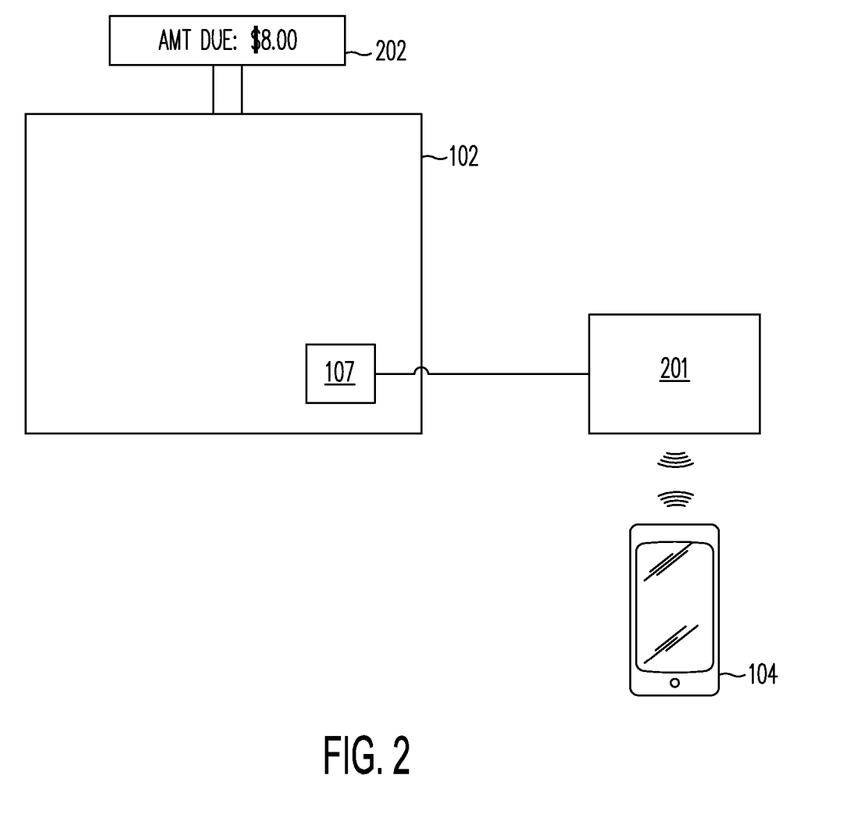
FIG. 2 illustrates an example system for making a payment at a merchant point of sale.
Figure 3:
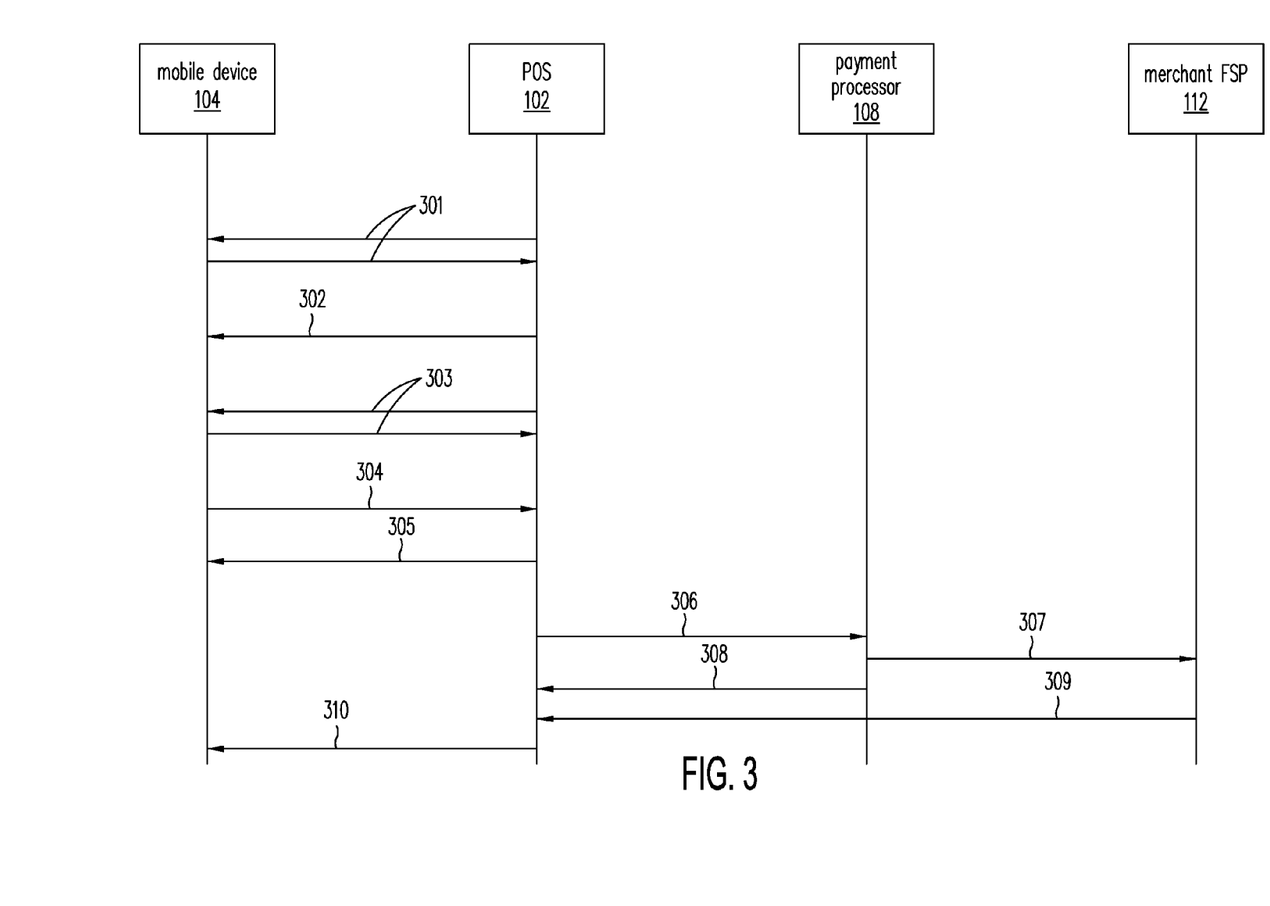
FIG. 3 is a signal diagram of communications that may be carried out in the configuration of FIG. 1.

FIG. 2 is an illustration of an example payment scenario that may be employed in some embodiments. FIG. 2 is offered as an example of a technique for a user device (such as a smartphone) to communicate with a merchant's device. FIG. 2 shows mobile device 104 proximal to POS 102, where POS 102 has an NFC terminal 201, which is controlled by communication application 107. The consumer can see the total of the transaction displayed upon POS display 202. In one example, the consumer physically taps the mobile device 104 against the terminal 201, which causes mobile device 104 and terminal 201 to negotiate and establish a P2P communication session. Mobile device 104 and terminal 201 then communicate as shown in FIG. 3 (described in more detail below). FIG. 2 is an example, and it is understood that the scope of embodiments includes any appropriate manner of establishing a communication session, whether using physical taps or some other technique and whether or not using NFC technology.

Returning to the example of FIG. 1, terminal 201 uses a wireless technology such as NFC to communicate with mobile device 104, e.g., to exchange transaction information and to receive consumer account credentials therefrom to complete payment for a transaction. POS 102 then communicates with payment provider 108 (e.g., PayPal™ or a bank) to instruct payment provider 108 to schedule a payment from an account of the consumer to an account of the merchant at FSP 112.

Further, as shown in FIG. 1, mobile device 104 has capability to communicate via network 110 (e.g., the Internet, a cellular network, and/or the like) wirelessly. Mobile device 104 is illustrated communicating through wireless base station 106, which may be a Wi-Fi access point, a cellular tower, or other facility. Thus, mobile device 104 may communicate wirelessly with both the POS 102 and the payment processor 108. An example of communicating wirelessly with the payment processor 108 includes updating account information, checking balances of accounts, and the like. Furthermore, although the mobile device 104 and terminal 107 may use a unidirectional protocol to exchange transaction information and account credentials, some embodiments may include wired or wireless bidirectional communication to exchange, for example, coupons, receipts, or other data that does not have high security concerns.

In the illustrated embodiment, mobile device 104 may include a smart phone, a basic feature phone, a notebook computing device, a tablet device, or other hand-held device. In some embodiments, mobile device 104 may be another suitable electronic device such as a computer tablet or laptop personal computer. The consumer may access an interface on mobile device 104 through a web browser, a specialized application, or other appropriate technique. For instance, a consumer may download application software programs, also known as "apps" or "applications" to the mobile device 104. In general, applications include computer software programs designed to execute specific tasks. As examples, Apple's® App Store, Microsoft's Windows® Store, and Google's Android Market® are examples of Internet stores that offer a multitude of applications, including entertainment programs, business applications, file management tools, and other widgets, etc.

As used in this example account credentials indicates the information that is used to facilitate payments to an account maintained at a financial service provider. This may include the ACH processing information, on-line payment provider information, banking information, credit card information, or other payment provider information. Furthermore, account credentials may include any information that may be used to identify or access an account, such as an account number, an expiration date, a security code, user identification and password, biometric information and the like.

In some embodiments, the terminal 201 and the mobile device 104 may include a Radio Frequency transceiver to receive and transmit, respectively, using RF radiation the account credentials to the application 107 on terminal 201.

In some embodiments, the transmitter and receiver use the same payment provider, wherein the payment processor 108 of the consumer is the payment provider of the merchant as well. In some embodiments, the payment providers are on-line payment providers which process payment without a credit card; in one example the merchant has an online payment account, such as a PayPal™ account, where the money is debited from the consumer account and credited to the merchant account.

Continuing with FIG. 1, when POS 102 has a network connection, POS 102 can request payment provider's 108 servers to schedule payment to the merchant's account. For instance, during a transaction, the application 107 on POS 102 may send appropriate information to payment provider 108 to schedule the transaction. Such appropriate information may include, but is not limited to, the consumer's account credentials, a merchant identification, electronic contact information of the merchant, a transaction amount, a description of the transaction (e.g., type of goods or services sold and a transaction identification number), and/or the like.

Furthermore, to complete the transaction, the payment provider 108 may communicate over network 110 to provide a transaction confirmation message to one or both of POS 102 and mobile device 104. In some embodiments the merchant may prefer a confirmation message directly from payment provider 108 and/or FSP 112 in order to prevent fraud.

The communication between the payment processor 108 and FSP 112 may be implemented in a variety of ways. The communication may follow a flow similar to the messaging procedures of ACH processes, or may implement a specific financial transaction processing. The communication may use a method similar to that implemented by PayPal™ for on-line payments, wherein the identifier for the transaction is the on-line ID, such as an email address or a telephone number; in these situations the on-line payment processor will process the transfer of funds, such as by credits and debits. The communication between entities in the transfer of funds, such as financial service providers, processors and their agents and intermediaries, may involve encrypted communications with handshaking between entities. A variety of security mechanisms may be implemented to make the payment flow more secure.

FIG. 3 is a signal diagram of communications that may be carried out in the configuration of FIG. 1. The signals of FIG. 3 may be provided in any appropriate manner, including wired or wireless, over any network or combination of networks, and may be formed according to appropriate messaging format. In one example, the messages between the mobile device 104 and the POS 102 are sent using an P2P NFC protocol, such as NPP or SNEP, whereas the communications involving FSP 112 and payment processor 108 may be carried out over the Internet or other network using TCP/IP or other protocols.

At action 301, the mobile device 104 and POS 102 negotiate a session. For instance, a human user may tap the phone against the physical terminal at the POS 102, causing the phone and the terminal to activate respective applications that set up the communication session. In one example using NPP, during setup of the session, the mobile device may send to the terminal (or vice versa) a message to ask if the other device supports a service called com.andriod.npp, and the other device may answer in the affirmative, thereby allowing both devices to setup a Logical Link Control Protocol (LLCP) session according to NPP and act accordingly. It is noted that NPP and SNEP are both referred to herein as unidirectional, though FIG. 3 shows bidirectional communication to setup the LLCP session; however, unidirectional as it is used in this example refers to the message payload and does not include session overhead, such as negotiation and acknowledgement.

The present example assumes that the mobile device 104 includes an application that is pre-installed with a certificate from payment processor 108 or other trusted third party so that mobile device 104 can verify a signature of the POS 102 before transmitting any information thereto. Such verification allows the application at the mobile device to verify that the merchant is really the merchant and is trusted by the payment processor 108.

At action 302, the POS 102 sends a first message to the mobile device 104, where the first message includes a digital certificate signed by payment processor 108. The message also has transaction information (e.g., a name of the merchant, the transaction amount, and a unique transaction ID) that is signed with the certificate of the POS that is sent across.

Mobile device 104 receives the message, extracts the certificate, and verifies the signature on the certificate using the pre-installed certificate at the mobile device application. The mobile device 104 then verifies the transaction information using the certificate of the POS. Such verification allows the application on the mobile device 104 to be sure of the identity of the merchant.

Mobile device 104 then creates a symmetric key, encrypts the key with the certificate from the POS, and uses the symmetric key to encrypt its own payment credentials and the transaction ID. The mobile device 104 then creates a response message with the symmetric key and encrypted payment credentials and transaction ID. Mobile device 104 then places the response message in its message queue. In an NPP embodiment, it assumed that the message in the message queue will be sent automatically the next time the mobile device 104 is tapped. However, the scope of embodiments is not limited to NPP.

After sending the first message to the mobile device 104, the POS 102 interrupts the LLCP session. For instance, the POS 102 may power off its transceiver or may cease operations in its software at the LLCP session layer of the protocol stack. During the time that the first LLCP session is broken, and before the second LLCP session is established, the mobile device 104 verifies the POS 102 and generates the response message. The POS 102 may be programmed with a specific time for pause that is long enough to allow the mobile device 104 to verify the POS 102 and generate the response message but not so long as to poorly affect the human user's experience.

At action 303, the POS 102 sends a signal to mobile device 104 to begin a second LLCP session, and the mobile device 104 and POS 102 negotiate and establish the session, as in action 301. During the second LLCP session, mobile device 104 sends the response message to POS 102 at action 304.

When POS 102 receives the response message, it decrypts the symmetric key using its private key and uses the symmetric key to decrypt the credentials and the transaction ID. POS 102 then sends an acknowledgement to mobile device 104 (at action 305) that the message was received and decrypted. In some embodiments, the message at action 305 may include the transaction ID, encrypted or unencrypted. The second LLCP session then ends. In some instances, the application at mobile device 104 may cause the mobile device to vibrate or use an audio or visual alarm to indicate that the data has been transferred.

At action 306, the POS 102 provides the decrypted account credentials and transaction information to payment processor 108. At action 307, payment processor 108 transfers the funds to the FSP 112 to cover the transaction.

Further in this example, FSP 112 confirms payment to POS 102 (action 309), and payment processor 108 may also confirm payment to POS 102 (action 308). POS 102 then confirms payment to mobile device 104 at action 310. However, in other scenarios, FSP 112 and/or payment processor 108 may confirm payment to mobile device 104.

The example of FIG. 3 mentions NPP as a protocol that may be used in some embodiments to facilitate payment using a mobile device at a POS. However, the scope of embodiments is not limited to NPP, as any appropriate wireless communication protocol that is unidirectional may be adapted at either the mobile phone or the POS to approximate a bidirectional communication session. Another example includes SNEP.

In the example above, POS 102 initiates the second LLCP session automatically and after an appropriate time has elapsed. In other embodiments, a human user may initiate the second LLCP session by, e.g., tapping the phone a second time against the POS hardware.

Furthermore, there may be scenarios wherein a particular mobile device includes multiple applications for making wireless payment at a POS. Accordingly, in some embodiments, there may be provided a technique for a user to specify which one of the applications to use to pay. For instance, a user may manually select the application on the mobile device, the POS may emit a signal showing which payment services it prefers, and/or the like.

In a further example a consumer pays for a transaction using a signed letter of credit rather than with credentials from a debit or credit account. In this example, a letter of credit includes a stored value token that is signed by payment processor 108 and saved to mobile device 104. In such an example, actions 301 and 302 are substantially similar to the example above. After verifying the POS 102, the mobile device 104 creates a response message that includes the stored letter of credit. When POS 102 initiates the second LLCP session, mobile device 104 passes the signed letter of credit to the POS 102 at action 304 as a response message. Upon receiving the signed letter of credit, POS 102 examines the signature thereon to authenticate the letter of credit. After authenticating the letter of credit, POS 102 amends the stored value token to reflect a debit equal to the transaction amount, signs the letter of credit with its signature, and sends the signed letter of credit to both mobile device 104 and payment processor 108 at action 306. Payment processor 108 then makes payment to FSP 112 accordingly.

One difference between the example using account credentials versus the example using a letter of credit is that the example using a letter of credit may add another communication session between POS 102 and mobile device 104 at action 306 for POS 102 to send the amended, signed letter back to mobile device 104. Such an embodiment may add a third LLCP session, thereby acting as a third tap to mobile device 104. These examples illustrate that various embodiments may use any appropriate payment technique during the transaction, and such payment techniques may be facilitated by the POS 102 and/or mobile device 104 establishing multiple unidirectional sessions to provide virtual bidirectional communication.

Figure 4:
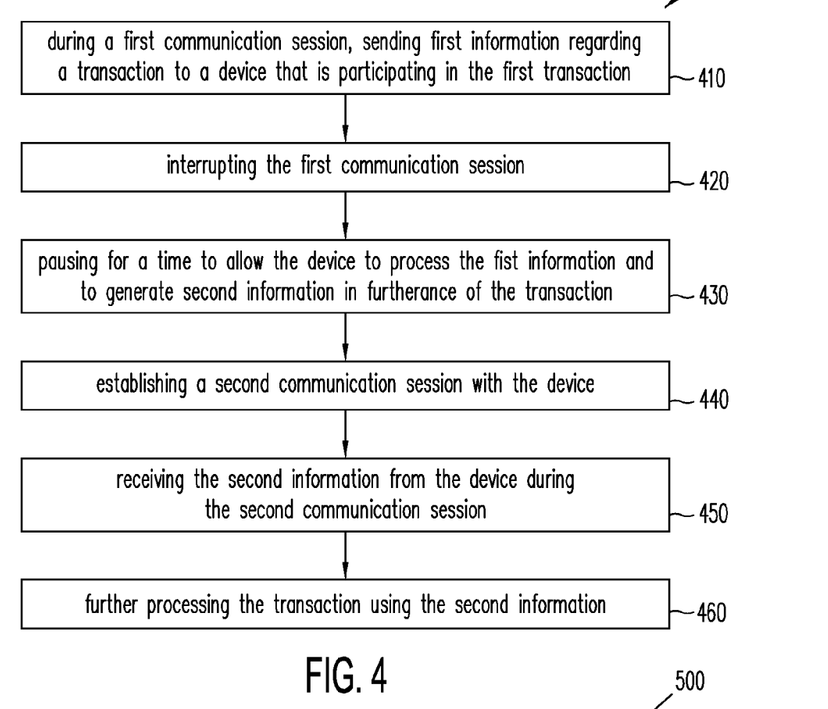
FIGS. 4 and 5 illustrate example methods to make payment at a POS from a consumer's electronic device.

Various embodiments include methods for making payment for a transaction wirelessly from a consumer to a merchant's account at a POS using a communication protocol that does not directly support bidirectional communication. FIG. 4 illustrates example method 400, adapted according to one embodiment, for making payments according to the principles discussed above in FIGS. 1-3. The example of FIG. 4 is from the perspective of the POS, and the actions of FIG. 4 may be performed by one or more processing devices, such as a terminal at a POS associated with the merchant. The one or more processing devices may execute code that provides a specialized application or other tool to transmit and receive information and to process received information.

At block 410, the POS sends first information regarding a transaction to a device that is participating in the transaction. The actions of block 410 are performed during a first communication session, such as an LLCP session. In one embodiment, the first information includes a transaction amount, transaction ID, a certificate, and/or the like, as described above with respect to action 302 of FIG. 3.

At block 420, the POS interrupts the first communication session. For instance, some embodiments may physically power down a transceiver of the POS, whereas other embodiments may disrupt the LLCP layer in the protocol stack of the software being run by the POS. One example protocol stack at a POS includes the following layers: 1) a physical connection layer, such as the electromagnetic waves that carry the data, 2) a data unit layer on top of the physical layer that includes Application Protocol Data Units (APDUs), 3) an LLCP logical link control protocol layer on top of the data unit layer, and 4) a SNEP or NPP layer on top of the LLCP layer. Thus, various embodiments may interrupt the communication session by disrupting one or more of the protocol layers.

At block 430, the POS pauses for a time to allow the device to process the first information and to generate second information in furtherance of the transaction. The amount of time that elapses during the pause may be chosen as appropriate to allow the other device to process the first information and to generate the second information. An example is the pause between actions 302 and 303 in FIG. 3.

At block 440, the POS establishes a second communication session with the other device. For instance, the POS may reestablish the operations at the protocol layers described above at action 420.

At block 450, the POS receives the second information from the device during the second communication session. In one example, the POS receives account credentials, which the POS may pass to a payment processor. In another example, the POS receives a signed letter of credit, which the POS may pass to the payment processor. In any event, the POS receives second information that it may use to receive payment, according to any appropriate technique.

At block 460, the POS further processes the information using the second information. For instance, the POS may send the account credentials or the signed letter of credit to the payment processor. Once payment is confirmed, the POS may send a confirmation to the other device.

The scope of embodiments is not limited to the particular flow shown in FIG. 11. Rather, other embodiments may add, omit, rearrange, or modify one or more actions in accordance with a given design. For instance, other embodiments may add an additional communication session for the POS to pass an amended, signed letter to the mobile device.

Figure 5:
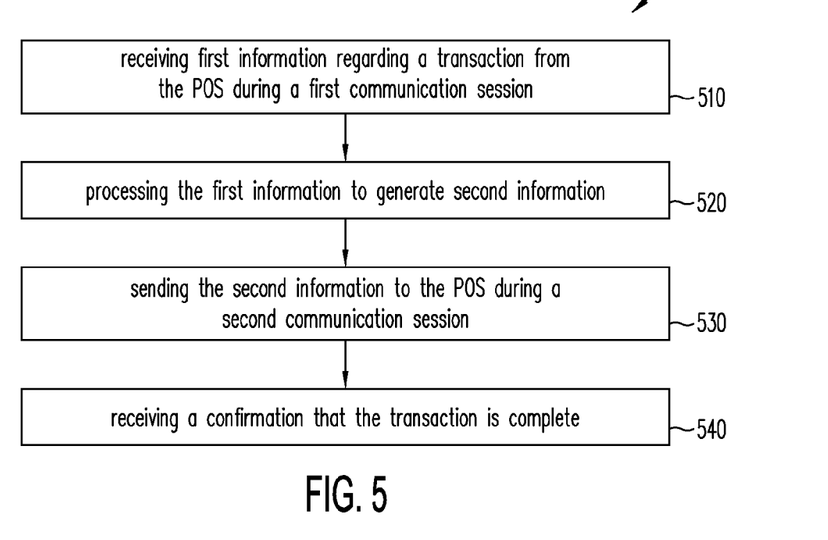

FIG. 5 is an illustration of example method 500, adapted according to one embodiment, to make payment at a point of sale. The example of FIG. 5 is from the perspective of the mobile device of the consumer, which passes information to the POS to make payment for a purchase. In some embodiments, the various actions are carried out by one or more computer processors executing computer code to provide the described functionality. For instance, the actions may be performed by a mobile device running an application that communicates with the POS.

At block 510, the application at the mobile device receives first information regarding a transaction from the POS during a first communication session. An example of receiving first information is described above at action 302 of FIG. 3, where the mobile device receives a digital certificate of the POS and a transaction description.

At block 520, the mobile device processes the first information to generate second information. In one example, block 520 include verifying the POS using the digital certificate and then generating a message that includes a transaction identifier and account credentials or other payment information.

At block 530, the mobile device sends the second information to the POS during a second communication session. In one example, the mobile device responds to an initiation of the second communication session by the POS, as in action 303 of FIG. 3 and then sends the response message, as in action 304 of FIG. 3.

At block 540, the mobile device receives a confirmation that the transaction is complete. Examples of actions at block 540 may include actions 305 and 310 of FIG. 3.

The scope of embodiments is not limited to the particular flow shown in FIG. 5. Rather, other embodiments may add, omit, rearrange, or modify one or more actions in accordance with a given design. For instance, method 500 may include the mobile device paying with a signed letter of credit rather with account credentials. In such instance, method 500 may further include an additional action in which the POS sends an amended, signed letter back to the mobile device during a third communication session. Furthermore, the transaction may be initiated by user input to the mobile device, such as by selecting an option from the application or physically tapping the mobile device on the terminal of the POS. However, the scope of embodiments is not limited to any technique to initiate the transaction or to any specific type of user input.

Various embodiments may provide one or more advantages over conventional techniques. For instance, various embodiments allow for mobile payment of transactions using communication protocols that have thus far been intended only for unidirectional communication. Thus, various embodiments can be used to adapt some conventional communication protocols in ways that add functionality to those protocols. Furthermore, various embodiments may be implemented by modifying P2P functionality at the POS (e.g., to have a pause between two unidirectional communication sessions) while leaving P2P functionality as-is at the mobile device.

Figure 6:
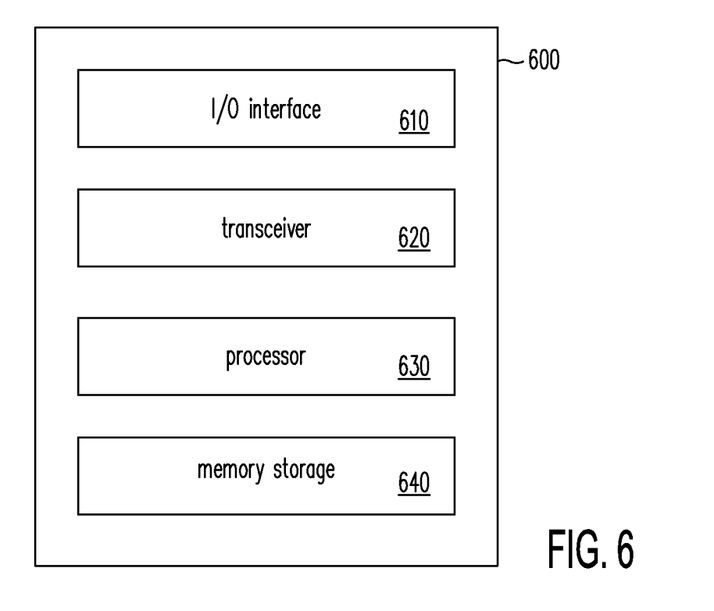
FIGS. 6 and 7 illustrate example block diagrams of computer systems for implementing various methods and devices described according to various aspects of the present disclosure.

FIG. 6 is a simplified block diagram of an example electronic device 600 on which a consumer may interact with a POS according to various aspects of the present disclosure. The electronic device 600 may be a portable personal electronic device, such as a smart phone, a basic feature phone, a laptop, a tablet, and/or the like. The electronic device 600 includes an input/output interface 610. The interface 610 is operable to receive an input from a user and communicate an output to the user. In an embodiment, the input/output interface 610 includes a visual display unit, for example a touch-sensitive screen. Input/output interface 610 may display a graphical interface, allowing the user to communicate with a payment provider and/or with a POS.

The electronic device 600 includes a transceiver 620. The transceiver 620 is operable to electronically communicate with external devices. In an embodiment, the transceiver 620 is operable to wirelessly communicate with a POS, cellular towers, or other network access points and infrastructure. The electronic device 600 also includes a computer processor 630 that is operable to execute computer instructions and a memory storage 640 that is operable to store the computer instructions.

The memory storage 640 also contains a program module that is an embodiment of the application that interacts with the POS and/or the payment provider. The program module operates to provide action such as receiving POS digital certificates, transaction information, etc., and passing account credentials or other payment information to the POS.

Figure 7:
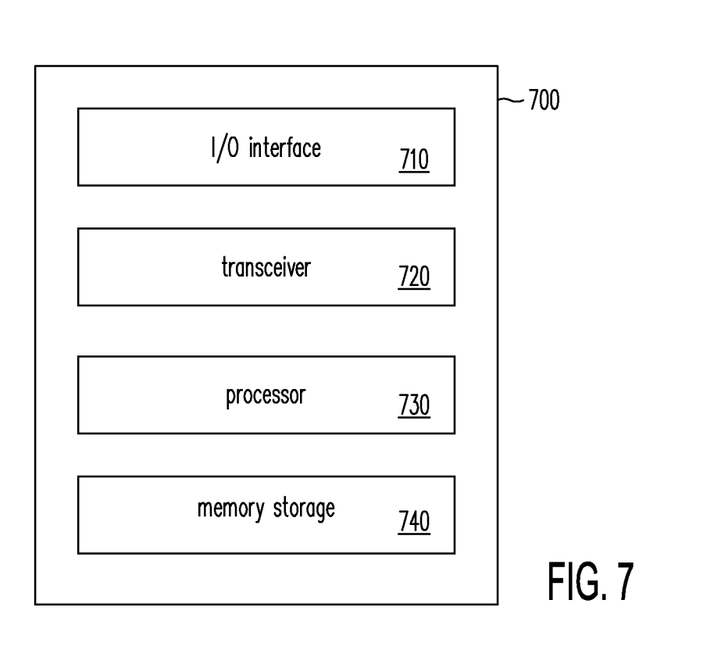

FIG. 7 is a simplified block diagram of an example electronic device 700 embodied as a POS according to various aspects of the present disclosure. The electronic device 700 may include a portable personal electronic device, such as a smart phone, laptop, or a tablet. The electronic device 700 may also include a more powerful computer, for example a server computer or a stand-alone computer system that is customized to perform sales actions. In other embodiments, a POS is a system that includes one or more interface terminals communicating with a computer system over a network. The electronic device 700 includes an input/output interface 710. The interface 710 is operable to receive an input from a user (e.g., an employee at a merchant's store) and communicate an output to the user. In an embodiment, the input/output interface 710 includes a visual display unit, for example a touch-sensitive screen on which a user may enter items to be purchased, scan items to be purchased, initiate a transaction, process a refund, and request/receive payment confirmation, and/or the like.

The electronic device 700 includes a transceiver 720. The transceiver 720 is operable to electronically communicate with external devices. In an embodiment, the transceiver 720 is operable to wirelessly communicate with a consumer's electronic device, cellular towers, or other network access points and infrastructure.

The electronic device 700 also includes a computer processor 730 that is operable to execute computer instructions and a memory storage 740 that is operable to store the computer instructions.

The memory storage 740 also contains a program module that is an embodiment of the application that interacts with the consumer's electronic device, a human user, and/or the payment provider. The program module operates to provide action such as sending a POS digital certificate and transaction information to the mobile device and receiving payment information from the mobile device.

In some instances, the POS includes an Electronic Cash Register (ECR) that has a terminal as a peripheral device, where the terminal includes the transceiver 720. An example of such a configuration is shown in FIG. 2. In some embodiments, the terminal itself includes a processor and a memory so that the terminal runs an application to communicate with the consumer's mobile device and passes information to and from the ECR. The scope of embodiments is not limited to any particular POS configuration.

Figure 8:
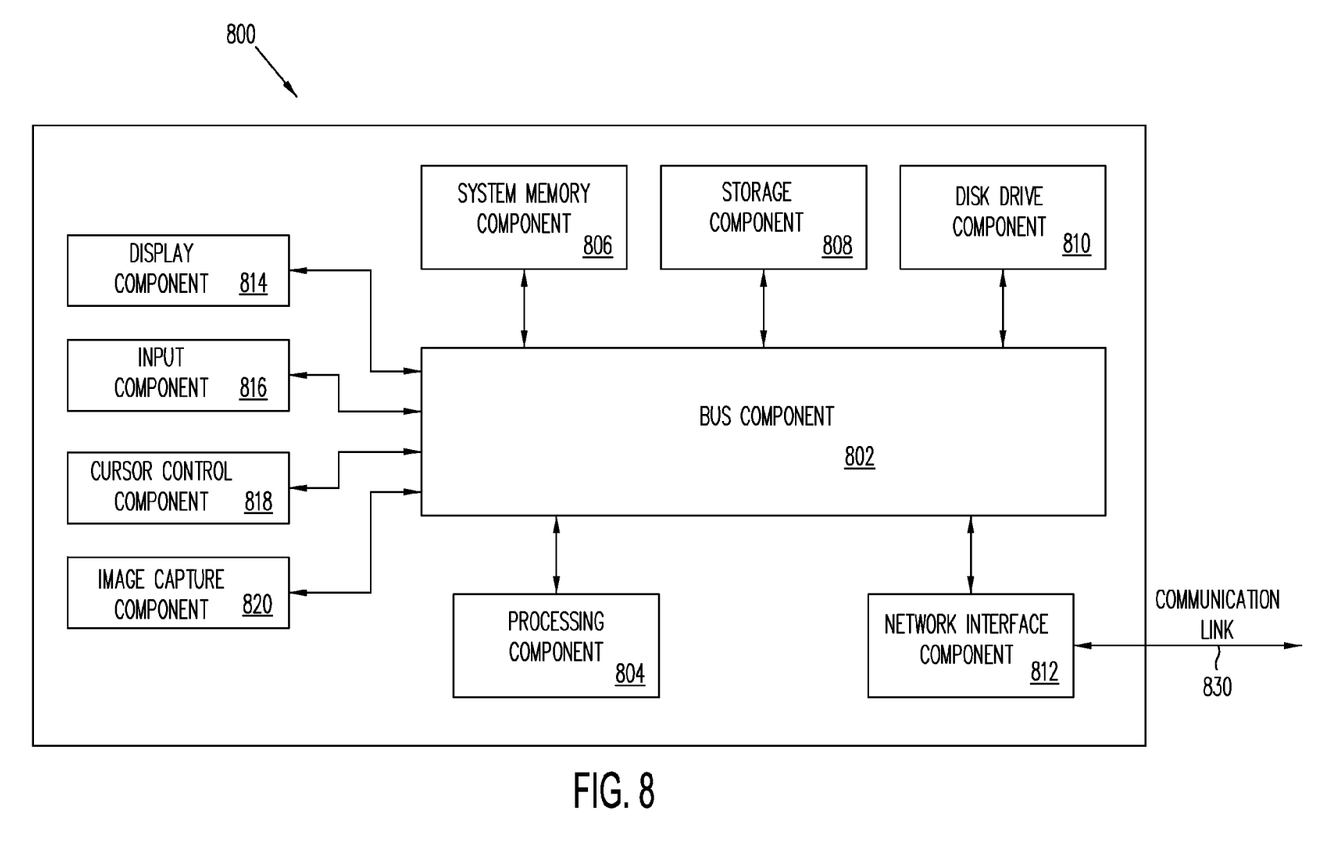
FIG. 8 illustrates a block diagram of a computer system for implementing various methods and devices described according to various aspects of the present disclosure.

FIG. 8 is a block diagram of a computer system 800 suitable for implementing various methods and devices described herein, for example, the various method blocks of the methods 400, 500. For example, the computer system 800 may represent a mobile device with which the consumer interacts to make mobile payments. In another example, computer system 800 may represent a computer that is a part of a merchant's POS system. In yet another example, the computer system 800 may represent a server computer or other type of computer that can be used as part of an account management or payment processing infrastructure at a payment provider (e.g., an FSP or payment processor) or may be implemented by a merchant. Accordingly, it should be appreciated that each of the devices may be implemented as the computer system 800 for communication with each other and/or with a network in a manner as follows.

In accordance with various embodiments of the present disclosure, the computer system 800, such as a mobile communications device and/or a network server, includes a bus component 802 or other communication mechanisms for communicating information, which interconnects subsystems and components, such as processing component 804 (e.g., processor, micro-controller, digital signal processor (DSP), etc.), system memory component 806 (e.g., RAM), static storage component 808 (e.g., ROM), disk drive component 810 (e.g., magnetic or optical), network interface component 812 (e.g., modem or Ethernet card), display component 814 (e.g., touch-screens, cathode ray tube (CRT) displays, or liquid crystal display (LCD)), input component 816 (e.g., keyboard or touch-sensitive components operable to detect a touch by a human body), cursor control component 818 (e.g., mouse or trackball), and image capture component 820 (e.g., analog or digital camera). Network interface component 812 may also include one or more transceivers for sending and receiving data either wired or wirelessly. For instance, component 812 may include Ethernet hardware, Wi-Fi antennas, a Bluetooth antenna, an NFC antenna, and/or the like. In one implementation, disk drive component 810 may comprise a database having one or more disk drive components.

In accordance with embodiments of the present disclosure, computer system 800 performs specific operations by processor 804 executing one or more sequences of one or more instructions contained in system memory component 806. Such instructions may be read into system memory component 806 from another computer readable medium, such as static storage component 808 or disk drive component 810. In other embodiments, hard-wired circuitry may be used in place of (or in combination with) software instructions to implement the present disclosure.

Logic may be encoded in a computer readable, non-transitory medium, which may refer to any medium that participates in providing instructions to processor 804 for execution. Such a medium may take many forms, including but not limited to, non-volatile media and volatile media. In various implementations, non-volatile media includes optical or magnetic disks, such as disk drive component 810, and volatile media includes dynamic memory, such as system memory component 806.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 830 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 800 may transmit and receive messages, data, information and instructions, including one or more programs (i.e., application code) through communication link 830 and communication interface 812. Received program code may be executed by processor 804 as received and/or stored in disk drive component 810 or some other storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An electronic device, comprising:
   a transceiver operable to electronically communicate with a computer network;
   a non-transitory memory storing instructions; and
   one or more hardware processors coupled to the transceiver and the non-transitory memory and configured to read instructions from the non-transitory memory to cause the electronic device to perform operations comprising:
      sending, during a first unidirectional communication session with a user device, first information regarding a transaction comprising a transaction amount to the user device that is participating in the transaction;
      interrupting, automatically after sending the first information, the first unidirectional communication session;
      pausing, automatically after the interruption, for a time to allow the user device to process the first information and to generate second information comprising payment processor information in furtherance of the transaction, wherein the interruption and the pausing cause the user device to queue the second information for transmission;
      establishing, automatically after the pause, a second unidirectional communication session with the user device while the user device is still within proximity of the electronic device;
      receiving the second information transmitted automatically from the user device during the second unidirectional communication session; and
      further processing the transaction using the second information.

2. The electronic device of claim 1, wherein the electronic device uses a protocol that does not allow bidirectional communication.

3. The electronic device of claim 1, wherein the electronic device comprises a Point of Sale (POS) device of a merchant.

4. The electronic device of claim 1, wherein the operations further comprise sending an acknowledgement to the user device after further processing the transaction.

5. The electronic device of claim 1, wherein the operations further comprise communicating with a funding source to receive payment for the transaction.

6. The electronic device of claim 1, wherein the first and second unidirectional communication sessions use Near Field Communication (NFC).

7. The electronic device of claim 1, wherein the interrupting includes at least one of:
   turning off, by the one or more hardware processors, power to the transceiver; or
   disrupting, by the one or more hardware processors, a communications software stack.

8. The electronic device of claim 1, wherein the first information further comprises a digital certificate.

9. The electronic device of claim 1, wherein the payment processor information comprises at least one of payment credentials for a payment account or a signed letter of credit.

10. A method comprising:
   transmitting first information from a merchant's computer device at a point of sale to a consumer's computer device electronically, the first information referring to a transaction comprising a transaction amount between the consumer and the merchant in which the consumer transfers funds to the merchant for a purchased item, the first information being transmitted during a first unidirectional communication session;
   interrupting the first unidirectional communication session automatically after transmitting the first information, wherein the interrupting causes the consumer's computer device to queue second information comprising payment processor information for transmission;
   after the interrupting, approximating bidirectional communication by automatically establishing a different second unidirectional communication session between the consumer's computer device and the merchant's computer device at the point of sale, thereby causing the consumer's computer device to automatically transmit the queued second information in furtherance of the transaction, the second information allowing the merchant to request payment from a funding source of the consumer;

initiating transfer of funds by providing at least a portion of the second information, from the merchant's computer device at the point of sale, to the funding source of the consumer; and receiving confirmation of the transfer of funds at the merchant's computer device at the point of sale.

11. The method of claim 10, wherein at least a portion of the first information includes a digital certificate to verify the merchant's computer device.

12. The method of claim 11, wherein at least a portion of the second information is digitally encrypted with the digital certificate.

13. The method of claim 10, wherein the first information comprises information identifying the transaction.

14. The method of claim 10, wherein the second information includes at least one of account credentials of the consumer or a signed letter of credit.

15. The method of claim 10, wherein the second information includes a signed letter of credit, the method further comprising:

amending the signed letter of credit to reflect a payment therefrom for an amount of the transaction; and sending the amended signed letter to the consumer's computer device in a third unidirectional communication session.

16. A computer program product having a non-transitory computer readable medium tangibly recording computer program logic for managing electronic payment, the computer program product comprising:

code to send first information regarding a transaction comprising a transaction amount to a user device that is participating in the transaction during a first unidirectional communication session with the user device;

code to interrupt the first unidirectional communication session automatically after sending the first information;

code to pause for a time, automatically after the interruption, to allow the user device to process the first information and to generate second information comprising payment processor information in furtherance of the transaction, wherein the interruption and the pause cause the user device to queue the second information for transmission;

code to establish, automatically after the pause, a second unidirectional communication session with the user device;

code to receive the second information transmitted automatically from the user device during the second unidirectional communication session; and code to further process the transaction using the second information.

17. The electronic device of claim 8, wherein the transaction amount is signed by the digital certificate, the digital certificate allowing the user device to verify an identity of the electronic device.

18. The method of claim 12, further comprising:

decrypting, after receiving the second information from the consumer's computer device, the at least portion of the second information that was digitally encrypted with the digital certificate.

19. The computer program product of claim 16, further comprising:

code to include, with the first information, a digital certificate;

code to decrypt the second information after receipt during the second unidirectional communication session, wherein at least a portion of the second information was encrypted with the digital certificate by the user device.

20. The computer program product of claim 16, wherein the code to interrupt the first unidirectional communication session further comprises:

code to disrupt a communications software stack.

* * * * *